United States Patent [19]

Tabarelli et al.

[11] Patent Number: 5,146,284
[45] Date of Patent: Sep. 8, 1992

[54] INTERFEROMETER GAS FLOW SYSTEM

[75] Inventors: Werner Tabarelli, IM Garsill 33, FL-9494 Schaan; Ernst Löbach, Eschen, both of Liechtenstein

[73] Assignee: Werner Tabarelli, Schaan, Liechtenstein

[21] Appl. No.: 623,390
[22] PCT Filed: Mar. 17, 1989
[86] PCT No.: PCT/EP89/00289
  § 371 Date: Jan. 16, 1991
  § 102(e) Date: Jan. 16, 1991
[87] PCT Pub. No.: WO90/11492
  PCT Pub. Date: Oct. 4, 1990

[51] Int. Cl.$^5$ .................................... G01B 9/02
[52] U.S. Cl. ........................ 356/345; 356/358; 356/361
[58] Field of Search ............... 356/358, 345, 349, 361, 356/400; 250/548

[56] References Cited

U.S. PATENT DOCUMENTS 4,643,577  2/1987  Roth et al. ..................... 356/358
4,765,741  8/1988  Detro et al. .................... 356/358
4,814,625  3/1989  Yabu ............................. 356/358

Primary Examiner—Samuel A. Turner
Assistant Examiner—Richard Kurtz, III
Attorney, Agent, or Firm—Lorusso & Loud

[57] ABSTRACT

In an interferometer for measuring displacements of a movable structural component, comprising a measurement interferometer arrangement (1), a partial beam traverses a measurement branch of variable optical length and is guided by an adjustable reflector system (11) connected to the movable structural component. The measurement interferometer arrangement (1) is arranged, together with the adjustable reflector system (11) including the whole measurement branch, in a sealed housing (3) which also contains a wavelength measuring device (2) for measuring the wavelength of the partial beam which travels through the measurement branch in a gaseous medium. A ventilator device (14) produces an air current in the housing (3), so that identical conditions, in particular identical temperature, pressure and humidity, always prevail in the medium in the measurement branch and in the spatially separate wavelength measuring device (2).

13 Claims, 2 Drawing Sheets

INTERFEROMETER GAS FLOW SYSTEM

An interferometer for measuring displacements of a movable structural component, comprising a light source for emission of a light beam, providing a beam splitting device for separation of the light into two partial beams, of which at least one portion of one of the partial beams traverses a reference path, and at least one part of the other partial beam traverses a measurement path of variable optical length, whereby it is guided by an adjustable reflector system attached to a movable structural component, and with a photoelectric detector device that analyses the intensity of the interfering partial beams which interfere after respective traversal of the reference and measurement path, whereby the optical components are arranged together with measurement and reference paths in a sealed housing which also contains a wavelength measuring device for measuring the wavelength of the partial beam which travels through the measurement path in a gaseous medium.

With such interferomic measurement, the length of the determined displacement path is in units of the wavelength existing in the gaseous medium of the employed light beam, whereby this wavelength depends upon the instantaneous refractive index in the medium (and naturally upon the frequency of the light beam.) The precise knowledge of the "instantaneous" refractive index in the medium, especially the measurement path, as well as of the frequency of the light beam or of the wavelength existing in the medium, is a prerequisite for the coveted precise knowledge of a moveable component's path in metric units.

With such an interferometer, with low relative uncertainty in measurement, it is therefore necessary in practice to determine the particular light wavelength in the medium using an apparatus for evaluating the specific wavelength. In principle, when knowing the frequency, procedures for determining the refraction index may be used, for example the "parameter method" (values for pressure, temperature and other parameters and formula-related calculation of the refraction indices) or the "refractometer method" (determination of the refraction index through comparison of the optical length of path of equal geometric distances in air in one case and in vacuum in the other case). If the frequency of the light is not exactly known, as the case may be with laser diodes, the possibility arises for interferometric comparison to a mechanical embodiment of a measure of specific length, whereby the wavelength of a lightbeam in medium can be directly determined (without separately determining the values of refraction index n and frequency f).

It is already known in production of interferometers, to arrange all the optical components in a sealed housing including the measuring and reference paths. Furthermore, one provides for arrangement of a wavelength determining device or the sensors(measuring-section)thereof within the housing. In such housing, a certain protection effect against impurities (dust, oil vapor, etc.) is initially created. These impurities can alter the refraction index and thus the wavelength. Furthermore, the housing avoids sudden sporadic changes in the medium condition, especially the temperature, thereby suppressing streaks in the measuring path that can be present in "open" measuring paths, and with which the real time measurement of the instantaneous wavelength of traversing partial-light beams in the measuring path, is controllable.

By the known methods there is, however, the possibility that the avoidance of variable refraction index is not achieved. On the contrary, fluctuation in pressure and thus fluctuation in the refractive index (which is dependant thereon) is intentionally generated in order to move the measuring pin. Also with the inward movement of the measuring pin, local pressure gradients (differential pressures) are created, that reduce the entire accuracy of measurement despite the conducted measuring of the refraction index. By these and other known Interferometer arrangements with wavelength or refraction index measuring devices, the problem arises, disregarding known disadvantages of specific determination procedures, of determining the actual instantaneous light wavelength existing in the measuring path. An exact working wavelength determining device, with reference to the entire achieved accuracy of measurement of the interferometer, offers no advantages whatsoever, if the medium conditions, (temperature, pressure, etc.) which determine the wavelength in the measuring range, disagree with the prevailing conditions in the wavelength measuring device within the framework of the required accuracy of measurement.

With local differential pressures during measurement, such equal medium conditions are surely not present. It is true, that the problems, which are associated with equal medium conditions in the entire measuring path and at the wavelength measuring device, may be reduced by arranging the wavelength determining device or the sensors thereof closer to the measuring path. However, in practice only little space is available near the movable structural component that lie in the vicinity of the measuring path, which does not permit such close arrangements, especially if the wave length value results from the comparison to a rather bulky embodiment of a measure. Moreover, such an interferometer (with substantially similar housing), is more flexible regarding the adjustment to the space available near the movable component, if the wavelength determining device or its measuring section lies locally separate from the measuring branch, while the measuring path, which is constructed according to a specific measuring task, e.g. is located in a housing extension, which is releasably connected to a basic housing.

The object of the invention is to produce a compact and sturdy interferometer of the type described at the outset, with which an extremely exact measurement of displacement of a movable structural component is possible, even if the environmental conditions change, e.g. due to changes in temperature, pressure, gas composition or humidity. This should also be possible, if the wavelength determining device or its measuring section, does not lie directly near the measurement path.

According to the invention, this is accomplished by the fact that there is provided a device, which may be turned on at least temporarily, for creating a gas-flow which reaches the measuring path the interferometer as well as the measuring section of the wavelength determining device.

With such a device it is possible, to produce or to maintain substantially equal (optically equivalent-)medium conditions (temperature, pressure, humidity, etc.) in the entire measuring path of the interferometer and in the measuring section of the wavelength determining device, i.e. on locally distinct places. Thereby an exact measurement of displacement of a movable component is possible even with changing environmental conditions. Thus, it is not essential to provide constant medium conditions in the housing, although the housing also contributes to the steadying of these conditions, but it is rather essential to maintain equal medium conditions at the measuring path and the measure section of the wave length determining device. The measuring section is the region where the measure values are determined (for Parameter method this is the place where temperature, pressure, and moisture sensors are located; for the method of comparison to a mechanical embodiment of measure this is essentially the region of the embodiment.) Naturally the specific arrangement electrical evaluating and display devices of the wavelength determining device is not that important. These devices may lie also external to the housing.

What is understood by "substantially equal" medium conditions in the framework of the presented invention, is such conditions where the corresponding relative refraction difference lies either below or equal to the required measurement accuracy for the displacement of the movable structural component. Should, for instance, the uncertainty of measurement with a displacement length of 1 meter be smaller than 0.1 $\mu$m, said relative refraction difference must be $\Delta n/n < 10^{-7}$, in order that the medium conditions can be regarded as "substantially equal". The invention's specific gas-flow can travel parallel to the wavelength determining device and the measuring path. Alternatively, a Gas-flow is also possible that flows in a series through the wavelength determining device and the measuring path. This is created i.e. through a ventilator device that can have a gas circulation device in the housing and/or a fanning device in the housing wall. With a fanning device, the creation of a vacuum (or near vacuum) in the housing appears possible, although a conditioned atmosphere, approximately at the external pressure, appears more advantageous with regard to the existing sealing problems.

The device according to the invention for generation of a gas-flow can be permanently turned on, whereby naturally a low gas rate of flow suffices for guaranteeing of overall equal medium conditions and is advantageous with regard to low pressure differences. In principle it is thinkable to turn off the device, e.g. during the actual measurement, and to only activate it between these measurements.

In order to transmit the displacements of the movable structural component to the movable reflector system in the housing, preferably a connecting device can be provided which extends through a brush sealing. The brush sealing in the sense of the invention's accuracy of measurement won't give rise to uncertainty in the transmission of the component movement to the reflector system's movement. In principle, it is also possible to arrange the movable structural component at least partly in the housing and guarantee the required practical enclosure of the housing through a bellows device or an equivalent.

In particular wavelength determining devices may be used which through an interferomic comparison of a light beam with a mechanical embodiment of measure (etalon)- determine directly the wavelength in a medium (without separate determined values of frequency of light and refractive index of the medium). It is essential that the employed etalons are "open", i.e. between the reflective surfaces serving as end measure gauges, essentially the same medium conditions as the actual measuring section can prevail through the employed gas-flow. In embodiment of the wavelength determining device is advantageous, where the device comprises an etalon with two spaced reflective surfaces and an auxiliary reflector that is movable over a path given by the spacing of the reflective surfaces and whose movement path is synchronously determined with an auxiliary interferometer, whereby substantially the same medium conditions are maintained through the gas-flow, at the movement path of the auxiliary reflector, between the two reflective surfaces of the etalon and in the actual ensuring path. With this embodiment, an absolute determination of the wavelength in the medium can be conducted without knowing the frequency of the light source.

In practice it is unnecessary to continuously determine the absolute value of the wavelength in the medium. Rather, a tracking of wave length fluctuations over a set period is sufficient for exactly knowing the wavelength at each point in time. A preferred embodiment provides that the wavelength determining device comprises, an auxiliary interferometer device for determining and/or compensation for wave length fluctuations, which determines the seemingly present spacing fluctuation of the two reflective surfaces through alteration of the refraction index of the medium and/or the frequency of the lightsource's emitted light, whereby theses reflective surfaces are formed by the reflective surfaces of an etalon or attached thereto, which is also used for the absolute determination of the wavelength. The particular advantage of this process lies in the fact that an etalon used for the determination of the absolute wavelength is simultaneously used for determining wavelength fluctuations, so that the number of places, where the medium conditions must be substantially equal to the measuring path, may be small.

The invention's features will be further illustrated in the following description of the drawings and working examples:

Figure 1:
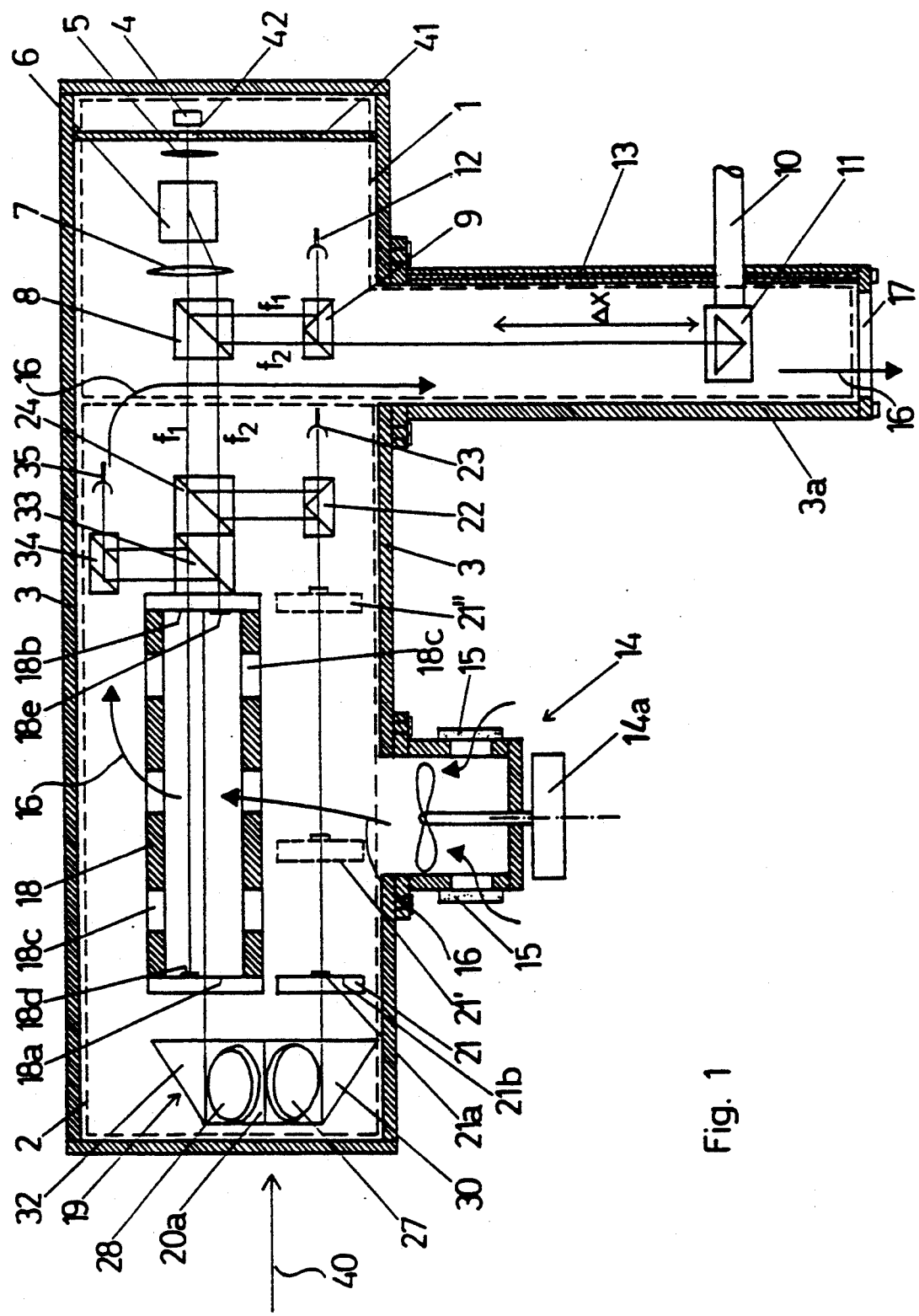
FIG. 1 is a top-view showing a schematic representation according to the invention of a interferomic device for measurement of a displacement path of a structural movable component.

The interferometer shown in FIG. 1 works according to the so called Heterodyn-procedure, where two partial beams with slightly different frequency are used.

The device shown in FIG. 1 encompasses an interferometer arrangement 1 for measurement of displacement path of a movable structural component, a wavelength determining device 2, and an essentially enclosed walled housing 3.

A laser diode (4) used as a light source emits a monochromatic, infrared light beam, that is collected by the lens 5 and is focused on the acousto-optical crystal 6. In this way the crystal 6 functions as a beam splitting device resulting in the creation of two separate partial beams with the frequencies f1 and f2, whereby the straight running partial beam has the original frequency f1, while the diffracted partial beam has a frequency shifted by $\Delta f$ (ca. 50 Mhz) (f2=f1+$\Delta f$). The following lens 7 aligns the two partial beams in parallel arrangement. A beam-splitter cube 8, having a semitransparent mirror layer, which is formed by the diagonal surface of a cube made of glass, guides a part of the partial beams in the direction of the merging device 9, in which the partial beam 1 travelling over a set reference path and the other partial beam travelling over the reflector system 11, which is connected to the movable structural component (not shown) by means of a connecting rod 10, are superimposed and guided to a photodetector 12 that is connected to an electronic evaluating device. Said merging device comprises solely two semitransparent mirrored surfaces, that are protected inside the glass bodies. With a motionless reflector system 11, the amplitude of the entire radiation impinging on the photodetector 12 varies with static-beat frequency $\Delta f$ of the two partial beams, which is measured in the evaluating device, which itself is not part of the invention. In contrast to the frequencies, f1,f2 of the partial beams that lie in the $5.10 \times 19(14)$ Hz range and presently are not directly measurable, $\Delta f$ which amounts to ca. 50 Mhz is directly and precisely measurable. With movement of the structural component relative to the Reflector system 11, the frequency of the partial beam travelling over the reflector system 11 varies proportionately to the displacement speed according to the Doppler-effect. The ensuing deviation of the photodetector's 12 accepted combination frequency from the static-beat frequency is a measure for the instantaneous displacement velocity, which by integration over time, provides the displacement path $\Delta x$ of the reflector system 11 in units of the wavelength existing in the medium at the measuring section. (in following said wavelength is referred to as air-wavelength, although other media besides air are possible). In order to find the displacement path in metric units, this air-wavelength must be exactly known at all times. For determination of this air-wavelength serves a shown wave length determining device 2, which will be further described below. The movable reflector system 11 is arranged within the housing together with the measure section $\Delta x$ in the measuring path, and the optical components of the wavelength determining device 2 arrange in the housing 3, whereby an air-flow from the fanning device 14 in the measuring path of the interferometer and also in the spatial separate measuring region of the wavelength determining device 2 guarantees essentially the same medium conditions especially temperature, pressure, and humidity. With regard to good equation of medium conditions in the measuring path and at the wavelength determining device 2 it would be most favorable to arrange the measuring path as closely as possible to the wavelength determining device. In practice, however, movable structural components which lie near the measuring path frequently present limited space, which does not allow such compact arrangements, especially if the wavelength value results from a comparison to a rather large embodiment of measure. Furthermore an interferometer is more flexible with regard to a good adaptation to the space available near the movable component, if the wavelength determining device or its measuring section, lies separate from the measuring path in the housing, while the actual measuring path depending on the specific measuring task, is housed in an extension 3a which is releaseably connected to the basic housing.

Figure 2:
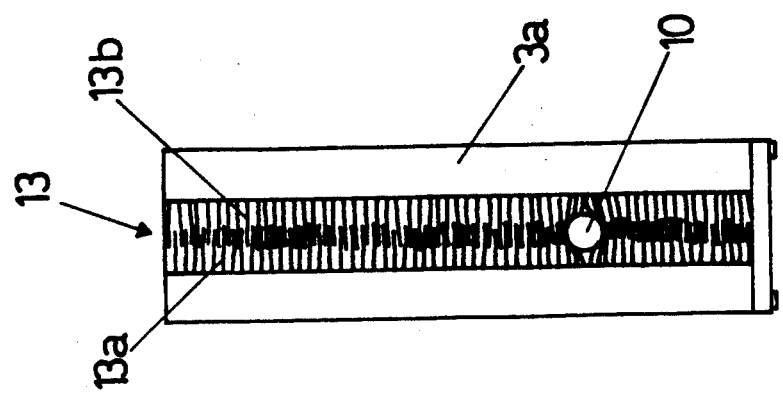
FIG. 2 shows a side-view of the brush sealing from FIG. 1.

In the embodiment shown, by which linear displacements of the structural component should be measured, this housing extension 3a comprises a slit sealed by a brush sealing 13 with respect to the connecting rod 12, whereby a part 13a of the bristles projects from one side of the housing slit, while the other part 13b of the bristles projects from the other side of the housing slit (FIG. 2.)

To guarantee equal medium conditions in the measuring path and at the wavelength determining device 2, a symbolically represented fanning device 14 is arranged in the housing wall, where air is drawn into the housing 3 from outside through a filter 15 and internally gives rise to a well defined essentially laminar flow (which is indicated by the arrow 16) lead through along the optical components of the wavelength determining device 2, along the measuring path and finally through the exhaust port 17 into the atmosphere.

In order to hold internal temperature gradients in the housing low, the driving motor 14a of the fanning device 14, as well as further heat sources are arranged as far as possible outside the housing 3.

The light source, in particular the laser diode 4, are insulated with regard to the housing area which contains the wavelength determining device 2 and the measuring path. In order to thermally insulate the laser diode 4, a partition 41 with an opening 42 is provided, in which a window made of transparent material can be installed.

The device generally referenced by 2 for determination of air wavelength exhibits a side open etalon 18 with two adjacent reflective surfaces 18a and 18b and a white-light-Michelson-interferometer 19, that encompasses an optical beam splitter 20, from which two partial beams depart, whereby both reflective surfaces 18a and 18b of the etalon 18 are arranged in the path course of the one partial beam and a movable auxiliary reflector 21 (21' and 21" show different locations of this auxiliary reflector)is arranged in the path of the other partial beam and these partial beams being reflected back to the beam splitter 20 of the white-light Michelson-Interferometer.

The displacement path of the auxiliary reflector 21, which carries an infrared-mirror(spot) 21a, is determined in units of the air wavelength by means of the beam splitter 22 (built in the same manner as the merger device 9), and a photodetector 23 of an interferomic arrangement, the photodetector being connected to an electronic evaluating device, this determining process using analog methods, as it is the case with the actual measuring section $\Delta x$. The two lightbeams f1 and f2 arrive at the beam splitter 22 via the deviating prism 24.

In contrast to the measuring section $\Delta x$, here the displacement path of the auxiliary reflector is precisely known in metric units by means of the open etalon 18 and the white-light-Michelson-Interferometer which will be further described in the following. A comparison of the displacement path determined in units of the air-wavelength by the beam splitter 22 and the photodetector 23 with the displacement path, which is on the other hand also known exactly in metric units, immediately provides the desired air wavelength of the light beam directed by the optical beam splitter 22 to the infraredmirror(spot) 21a, whose other part, which departs from the beam splitters, is used on the actual measuring section $\Delta x$.

The displacement path is precisely given in metric units through the spacing of both reflective surfaces 18a and 18b of the etalon 18, whereby the etalon 18 is formed from material with low temperature-coefficient of expansion and will be further described below.

Figure 4:
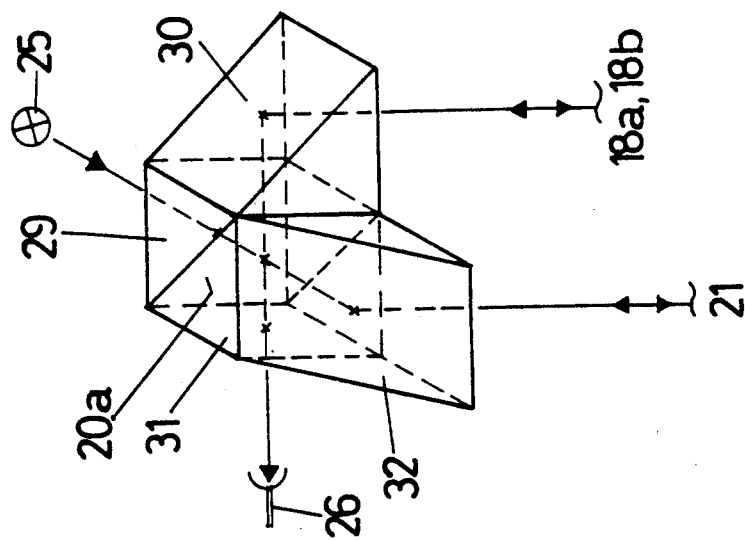
FIG. 4 is a perspective view of its beam-splitter.
Figure 3:
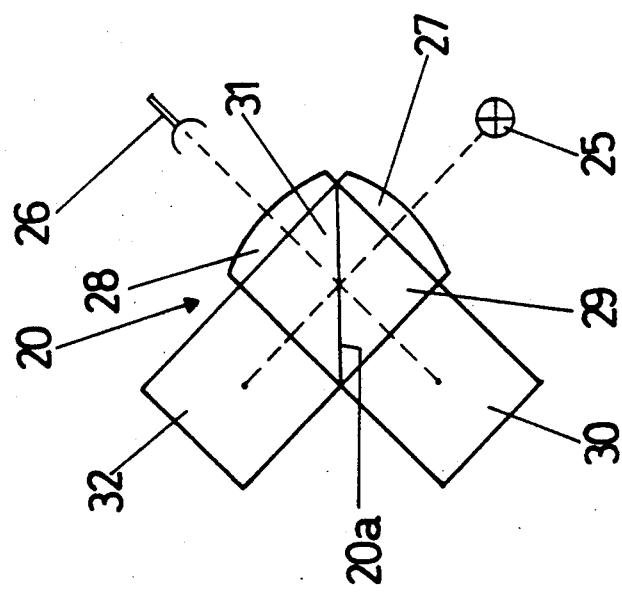
FIG. 3 shows the Michelson-Interferometer the wavelength determining device of FIG. 1 in a side view according to the "arrow" A in FIG. 1.

In the present embodiment, the exact reading of this reference section of the etalon 18, i.e. the transference of this reference section to the displacement path of the reflector system 14, takes place by means of the white-light-Michelson-Interferometer 19, that is further represented in the FIGS. 3 and 4.

The white-light-Michelson-interferometer 19 comprises a beam splitter 20, that is provided with deviating systems made of a single prism symmetrically to the actual beam splitter layer 20a. The white-light Michelson interferometer further comprises a white-light source 25 (for example a possible punctiform Microprojection-Halogen lamp) and a photo detector 26, that are arranged in each case on the focal point of the collective lens 27 or 28 (FIG. 3). Through the collective lenses parallel beams are generated with relative large diameter or such beams are focussed on the photodetector 26. The advantage of said symmetrical deviating systems, that guarantee similar glass paths for the partial beams on both sides of the beam splitter layer 20a, lies in the fact that both partial beams run parallel (in contrast to the classical Michelson-interferometer where the partial beam of the two interference paths run perpendicular to each other). The parallel design allows for an essentially more compact construction of an entire wave length determining device 2 than with perpendicularly running partial beams. Furthermore, the displacement path of the auxiliary reflector 21 lies directly near the opening 18c of the provided etalon 18, wherethrough the practically equal air conditions between the reflective surfaces 18a and 18b of the etalon 18 on one side and the displacement path of the aux reflector 21 on the other side, are guaranteed. furthermore, these air conditions agree with those in the measuring path through the air flow.

From FIG. 4 it is clear how the deviating systems of the beam splitter 20 are formed by two half-cubes 29, 30, 31, and 32, respectively. For the sake of clarity, the collecting lenses 27 and 28 are not represented in FIG. 4

The partial beams reflected from the auxiliary reflector 21 and from the etalon 18 reach again the beam splitter layer 20a, where they are recombined and from where they arrive at the photodetector 26. If the optical path length (to and from the beam splitter layer 20a) of the partial beam travelling over the auxiliary reflector 21 corresponds to the optical path length for the other partial beam between the beam splitter layer and one of the two reflective surfaces 18a or 18b, then the photodetector detects a minimum or a maximum depending on the construction of the beam splitter 20. This extreme value appears for all wavelengths existing in the white-light instantaneously only if the optical light path over the auxiliary reflector 21 on one side corresponds completely with the optical light path over one of the two reflective surfaces 18a and 18b. If the movable auxiliary reflector 21 also slides along a suitable displacement path, an extreme value in the photodetector will appear twice in the course of the this movement. The displacement path between these two extreme values corresponds exactly to the separation of the reflective surfaces 18a and 18b of the etalon 18 known in metric units. The etalon 18 presents a mirrored-layer 18a lying perpendicular to the beam-way and semi-permeable to white-light and a second full-mirrored-layer 18b lying behind with a reflective degree of over 95% for all wavelengths in the white-light. The movable auxiliary reflector 21, which presents a plane parallel glass plate as a carrier, comprises another mirrored layer 21b near the infrared-mirrored-spot 21a, the layer 21b reflecting the white-light of the white-light Michelson interferometer 19. Advantageously through this design a complete separation of the light in the Michelson-interferometer from the light beam (in this case infrared), whose airwave length should be determined, is created.

Said etalon 18 as described above, that serves for absolute determination of air-wavelength, is simultaneously used for controlling wavelength fluctuations. To this end, it carries an infrared mirrored-layer 18d or 18e on the reflective surfaces 18a or 18b respectively, each of these layers 18d and 18e reflecting a partial beam of determined frequency from the beam splitter 6 and stemming from the light source 4 via a beam splitter 33 to a merging device 34. A photodetector 35 and an connected evaluation unit (not shown) monitor the beat frequency of the signal emitted from the merging device 34. This beat frequency is normally (always provided that there is a constant frequency splitting in the splitter 6) constant, since the infrared-mirror-spots 18d and 18e show a firm separation distance. If changing the frequency of the light source 4 or the refractive index of air in the measuring path and thus the refractive index in the etalon 18 changes, the photodetector will detect seeming spatial change between the infrared-mirrored-spots 18d and 18e. From this, the wavelength fluctuation is measurable.

The invention is not limited to the shown embodiments. The housing does not need to possess exclusively rigid walls. It is possible that the housing consists of at least two housing-parts that are inter-connected with flexible tubing or rigid pipe thereby forming a complete, essentially enclosed unit. In principle, it is also thinkable that the beam path runs outside of the housing or housing-parts at some locations. If one employs non-transparent housing walls for the internal laser light of the interferometer arrangement, an additional protection effect is obtained, especially for eyes, from the emitted direct-beam or the stray-beam.

In the shown embodiment, the gas-flow flows in a series through the wave length determining device and then over the measuring path. Of course other arrangements are possible where the wave length determining device and the measuring path lie parallel with relation to the gas-flow.

It is also to be mentioned, that open etalons of fixed length can be used for wavelength determination, whereby the interference patterns (rings) are determined by photodetectors and are electronically evaluated. In particular with small mirror-separation of an etalon (in mm range) and with designated small openings of space between the mirrored-surfaces of the etalon, the gas-flow according to the invention is of great advantage, to produce in the etalon not only equal pressure and temperature but also equal other parameters like humidity or gas-composition, so that all parameters are equal as is found in the measuring path.

The enclosed interferometer can also work according to a nonheterodyne measuring process, like a single-frequency interferometer, where in the simplest case, the beam splitter device for generation of two partial beams and the merging device are formed through one and the same semi-transparent layer. In application, the interferometer is not limited to the determination of linear displacement of a movable structural component. Also rotations or tilting of the mobile component can be accounted for.

Although wavelength determining devices, that are based on comparison to an embodiment of measure and thus directly determine the light wave length in the medium, are desired, other devices, which essentially determine refraction index, are thinkable and possible.

We claim:

1. Interferometer for measuring displacements of a movable structural component, comprising a light source for emission of a light beam, providing a beam splitting device for separation of this light beam into two partial beams, of which at least a part of one of the partial beams traverses a set reference path and at least one part of the other partial beam traverses a measuring path of variable optical length whereby said other partial beam is guided by an adjustable reflector system connected to a movable structural component, and with a photo-electric detector device that analyzes the intensity of the interfering partial beams which interfere after respective traversal of the reference and measuring paths, whereby the optical components are arranged together with measuring and reference paths in a sealed housing which also contains a wavelength measuring device for measuring the wavelength of the partial beam which travels through the measurement path in a gaseous medium, characterized in that there is provided a device for creating a gas-flow which reaches the interferometer as well as the measuring section of the wavelength determination device which is turned on when equal medium conditions are desired.

2. The device according to claim 1, wherein a ventilator device is provided which gives rise to a gas-flow in the housing from the measuring section of the wave length determining device to the measuring path of the interferometer, or vice versa and is turned on when equal medium conditions are desired.

3. The device according to claim 2, wherein the ventilator is a gas-circulating device, which circulates the gas inside the housing.

4. The device according to claim 2, wherein the ventilator is a fanning device which is preferably set in the housing wall and which draws air from outside into the housing or pumps air out of the housing and preferably gives rise to essentially a laminar air-flow.

5. The device according to claim 4, wherein the fanning device is connected to at least one filter.

6. The device according to claim 1, wherein between single housing sections one or more installed pressure valve in particular throttle valve(s) is (are)arranged in the housing sections to regulate the pressure in the housing sections.

7. The device according to claim 1, wherein all heat sources of the interferometer, in particular the light source(s) are insulated against the housing region that contains the measuring path and the wavelength determining device.

8. The device according to claim 1, wherein the movable component, whose displacement is measured, lies outside of the housing and is rigidly connected to the movable reflector system by means of a connecting device, in particular a connecting rod, which extends through a brush sealing in the housing wall.

9. The device according to claim 8, wherein a part of the bristle of the brush sealing projects on a side of a housing slit and the other part (13b) of the bristle projects on the opposing side of the housing slit into housing slit.

10. The device according to claim 1, wherein the housing comprises of at least two housing sections, that are interconnected with flexible tubing or rigid pipe and form a complete essentially enclosed unit.

11. The device according to claim 1, wherein the wave length determining device comprises an etalon as mechanical embodiment of measure which includes two spaced reflective surfaces, whereby that distance of the reflective surfaces, which is known in metric units, is interferomically determined in units of the wavelength of the employed light beam in the medium, and wherein the same gas-flow is conveyed through that space between the reflective surfaces and the actual measuring path of the interferometer.

12. The device according to claim 11, wherein the wavelength determining device comprises an etalon with two spaced reflective surfaces, and an auxiliary reflector that is movable over a distance between the two spaced reflective surfaces and whose displacement path is simultaneously determined by a auxiliary interferometer, whereby by the gas-flow essentially the same medium conditions are created or maintained at the displacement path of the auxiliary reflector between the two reflective surfaces of the etalon and in the actual measuring path.

13. The device according to claim 11, wherein the wavelength determining device comprises an auxiliary interferometer for determination and/or compensation of wave length fluctuation, which determines seeming changes of the fixed distance of two reflective surfaces, these changes being caused by changes in the refractive index of the medium and/or the frequency of the light emitted from the light source and wherein these reflective surfaces are the surfaces of an etalon which is also used for a determination of the absolute wavelength.

* * * * *